Aug. 24, 1926.

C. A. WISE 1,597,645

DEMOUNTABLE RIM CLAMP

Filed March 25, 1925    2 Sheets-Sheet 1

Charles A. Wise
INVENTOR

BY Victor J. Evans
ATTORNEY

WITNESS Gerald Hennesy B.

Aug. 24, 1926.
C. A. WISE
1,597,645
DEMOUNTABLE RIM CLAMP
Filed March 25, 1925    2 Sheets-Sheet 2
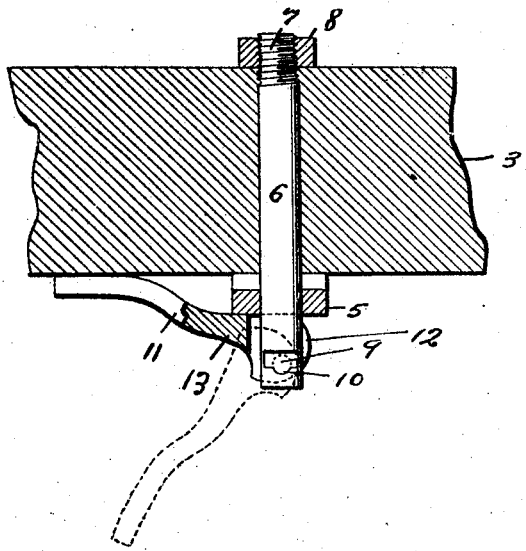
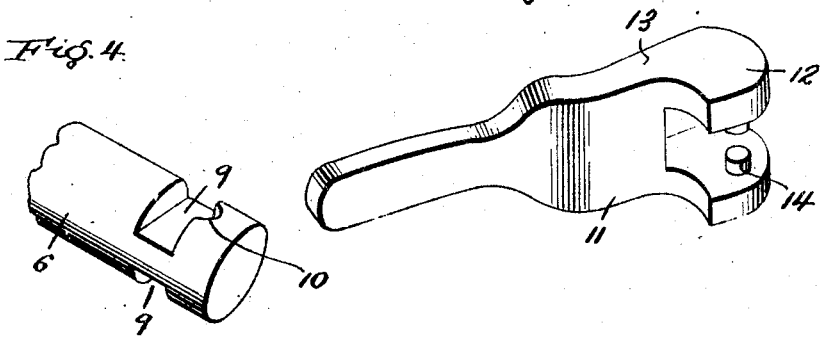
Charles A. Wise
INVENTOR
BY Victor J. Evans
ATTORNEY
WITNESS: Gerald Hennley Patented Aug. 24, 1926.

1,597,645

UNITED STATES PATENT OFFICE.

CHARLES A. WISE, OF SAULT STE. MARIE, MICHIGAN.

DEMOUNTABLE-RIM CLAMP.

Application filed March 25, 1925. Serial No. 18,280.

The object of my said invention is the provision of a device adapted for the expeditious and easy fastening and unfastening of a demountable rim and this without liability of the rim becoming casually unfastened.

To the attainment of the foregoing, the invention consists in the improvement as hereinafter described and definitely claimed.

In the accompanying drawings, forming part of this specification:—

Figure 3 is a section taken in the plane indicated by the line 3—3 of Figure 1.

Figure 4 is a detail perspective on an enlarged scale of a portion of the bolt comprised in my improvement.

Figure 5 is an enlarged perspective of the cam lever of the improvement.

Similar numerals of reference designate corresponding parts in all of the views of the drawings.

Figure 1:
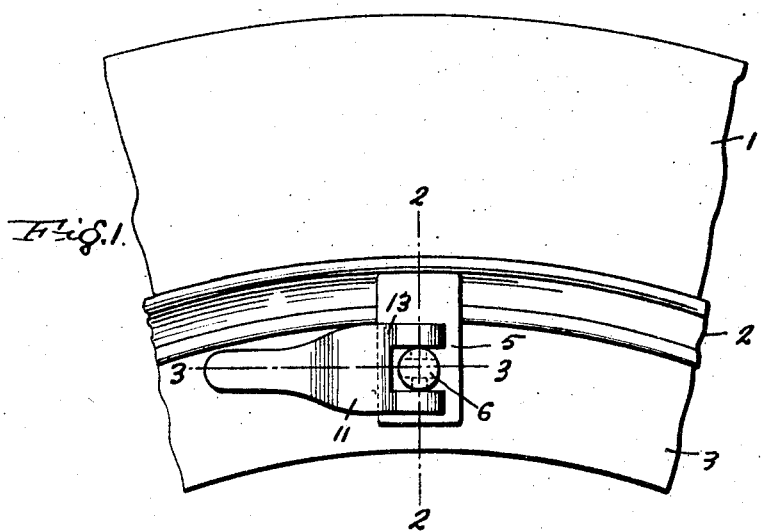
Figure 1 is a side elevation showing the preferred embodiment of my invention as it appears when locked to hold a demountable rim on a wheel rim.
Figure 2:
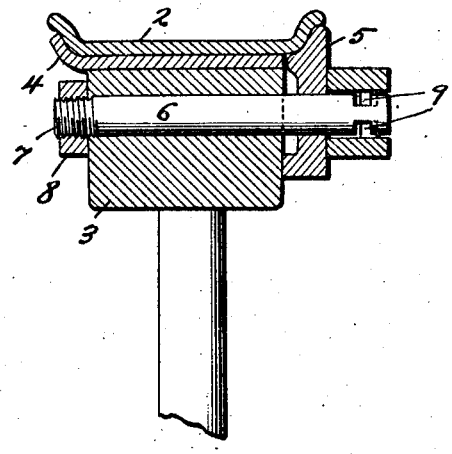
Figure 2 is a section taken in the plane indicated by the line 2—2 of Figure 1.

I show in Figures 1 and 2 an automobile wheel tire 1 and a flanged demountable rim 2 in engagement with the tire; and I also show a wheel felly 3, a flanged rim 4 on the felly and engaged with the demountable rim 2, and a lug 5 at one side of the felly and for cooperation with the demountable rim 2 to confine the latter against the flange of the rim 4.

Among other elements my improvement comprises a bolt 6. The said bolt 6 is passed transversely through the felly 3 in the embodiment illustrated and is threaded at 7 for the engagement of a nut 8 which is ordinarily located at the inner side of the wheel. In the embodiment illustrated the bolt 6 is also passed through the lug 5 and outwardly beyond said lug 5 the bolt is provided with opposite notches 9 best shown in Figure 4 and opposite rounded bearings seats 10, the said seats 10 being in comunication with the notches 9 and extending from the same toward the adjacent end of the bolt.

For cooperation with the bolt 6 and the lug 5 my improvement includes a cam lever 11. The cam lever is provided with a bifurcated portion 12 and a flat surface 13 and is also provided with trunnions 14 arranged in coincidence with each other and disposed at the inner sides of the arms of the bifurcated portions.

It will be apparent from the foregoing that the lever 11 is adapted to be quickly and easily associated with the bolt 6 in such manner that the trunnions 14 rest in the bearings 10; also, that the lever 11 is adapted to be as readily disassociated from the bolt 6.

The nut 8 is manifestly adapted to be manipulated for the taking up of wear whenever the latter is necessary.

In the practical use of my improvement it will be understood that the lug 5 and the cam lever 11 may be relatively arranged as shown in Figure 2 on the bolt 6 after the demountable rim 2 is placed about the rim 4 as illustrated in Figures 1 and 2. Then by exerting stress against the lever 11 and moving the said lever 11 from the dotted line position shown in Figure 3, the cam lever will operate to tighten the bolt 6 and to exert great pressure against the lug 5, thereby strongly holding the lug 5 against the demountable rim for the purpose stated. In this connection it will be understood that when the cam lever 11 is in the working position described, the flat surface 13 will rest flat against the outer side of the lug 5 with the result that there is no liability of the lever 11 casually moving from the full line position shown in Figure 3 while the wheel is in use. When, however, it is desired to remove the rim 2, it is simply necessary to interpose a prying instrument between the lever 11 and the wheel and thereby start the lever 11 toward the dotted line position of Figure 3. In said dotted line position the lever 11 may manifestly be quickly disengaged and removed from the bolt 6 as may also the lug 5 when the rim 2 may be readily removed from the rim 4 for the placing on said rim 4 of a rim such as 2 bearing a fresh tire. After the placing of the fresh tire as stated the lug 5 and the lever 11 are engaged with the bolt, and the lever 11 is moved to the full line position shown in Figure 3 for the purpose before stated.

It will be noticed that the bolt employed in my improvement is without a head, and hence my improvement is adapted to be used to advantage on the type of rim having attached lugs, the lugs and rim being adapted to be demounted after the removal of the cam lever 11 in tne manner described.

My improvement is calculated to enable a motorist to quickly unfasten and remove a demountable rim and as readily replace and fasten the said rim, and this without the assistance of any tool other than a prying instrument which may be in the form of a screwdriver or similar instrument.

I have specifically described the preferred embodiment of my invention in order to impart a definite understanding of the same. I do not desire, however, to be understood as confining myself to the specific construction and relative arrangement of parts inasmuch as the scope of my invention is defined by my appended claims within which changes or modifications may be made without affecting my invention.

Having described my invention, what I claim and desire to secure by Letters-Patent, is:—

1. In means for the purpose stated, a bolt threaded at one end and having opposite notches adjacent to its opposite end and also having opposite bearing seats in communication with said notches and between the notches and said end, in combination with a cam lever having a bifurcated portion with arms spaced apart and trunnions on the inner sides of said arms being removably seated in said bearings, and a nut on the threaded portion of the bolt.

2. The combination of a bolt having oppositely disposed notches adjacent to one of its ends and also having opposite bearings in communication with said notches and between the notches and said end, and a bifurcated cam lever having spaced arms and coincident trunnions on said arms to seat in said bearings, said cam lever being detachable from the bolt.

3. In combination of a demountable rim for wheels, a lug for engaging said demountable rim, a bolt fixed to the wheel and extending laterally therefrom and having oppositely disposed notches and also having opposite bearings in communication with the notches and between the same and the outer end of the bolt, said bolt extending through said lug and a cam lever having a bifurcated portion and also having coincident trunnions on the inner side of the arms of the bifurcated portion and removably seated in said bearings, said cam lever in operative position adapted to guard and hold said lug under pressure against the adjacent portion of the demountable rim.

In testimony whereof I affix my signature.

CHARLES A. WISE.